No. 724,772. PATENTED APR. 7, 1903.
J. ALEXANDER.
TYPE WRITER.
APPLICATION FILED OCT. 1, 1901.
NO MODEL. 14 SHEETS—SHEET 11.
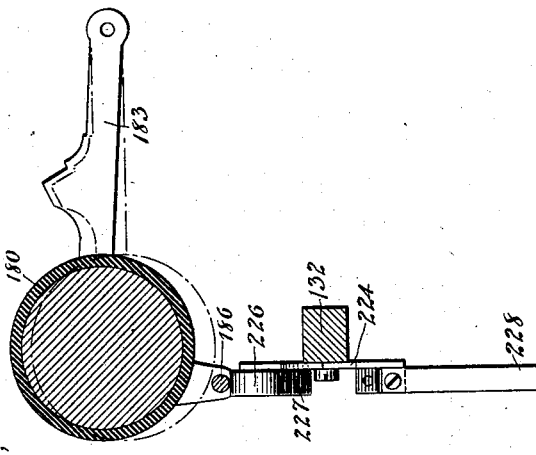
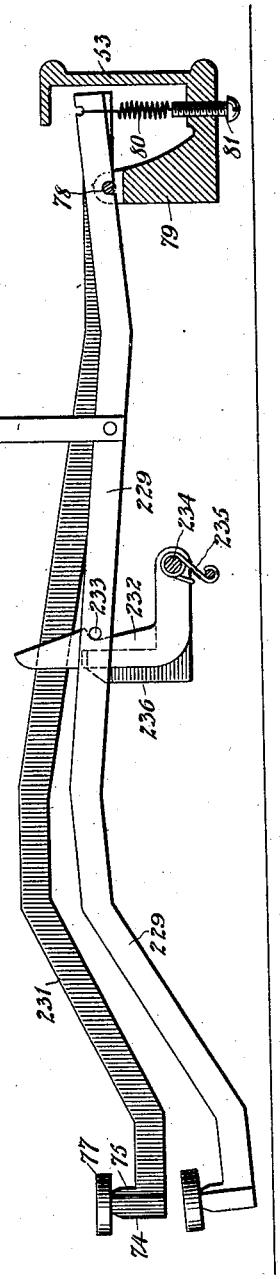
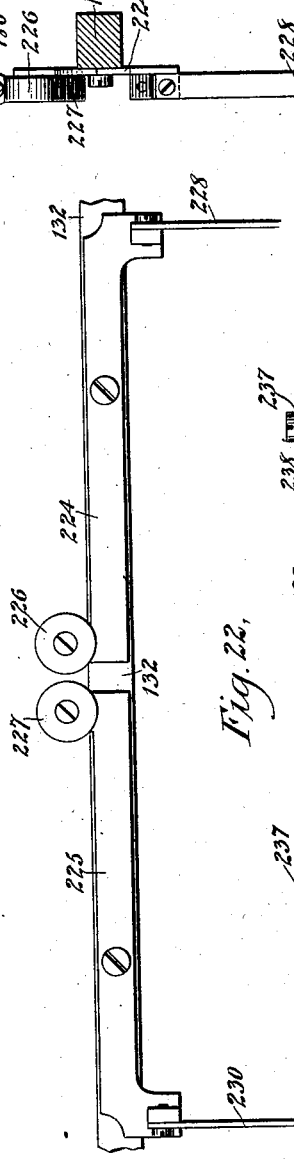
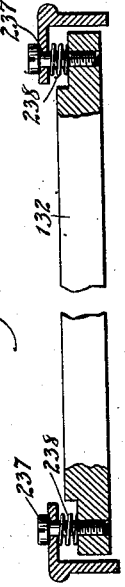
WITNESSES:
Edward Thorpe.
C. R. Ferguson
INVENTOR
Jesse Alexander
BY
Munn
ATTORNEYS No. 724,772. PATENTED APR. 7, 1903.
J. ALEXANDER.
TYPE WRITER.
APPLICATION FILED OCT. 1, 1901.
NO MODEL. 14 SHEETS—SHEET 12.
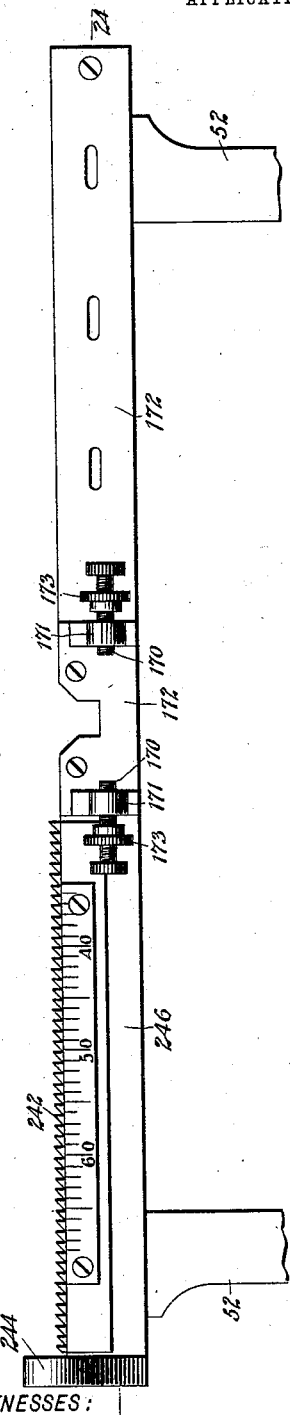
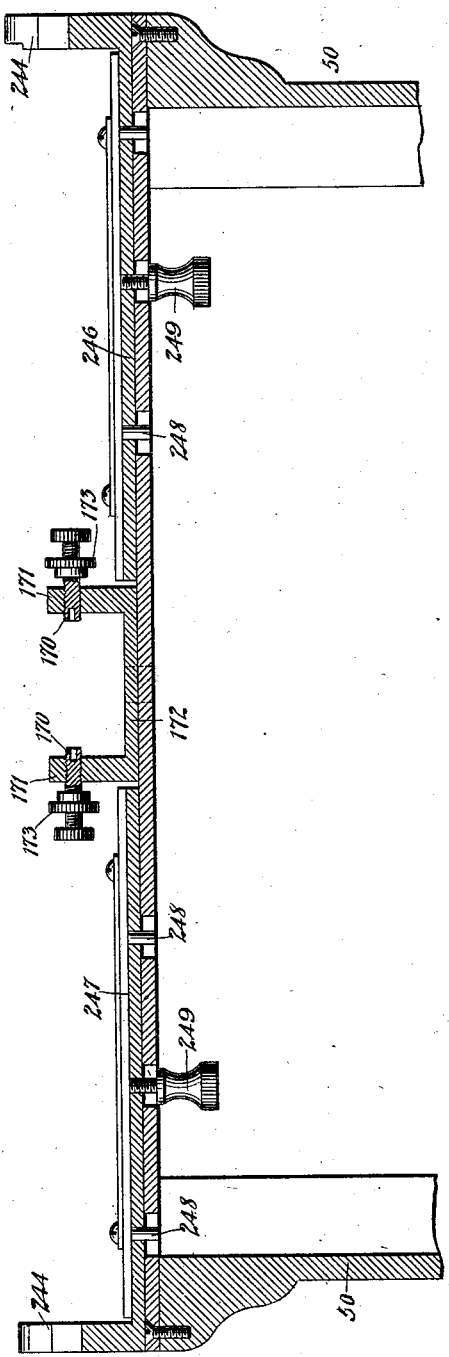
WITNESSES:
Edward Thorpe
C. R. Ferguson
INVENTOR
Jesse Alexander
BY
ATTORNEYS No. 724,772. PATENTED APR. 7, 1903.
J. ALEXANDER.
TYPE WRITER.
APPLICATION FILED OCT. 1, 1901.
NO MODEL. 14 SHEETS—SHEET 13.

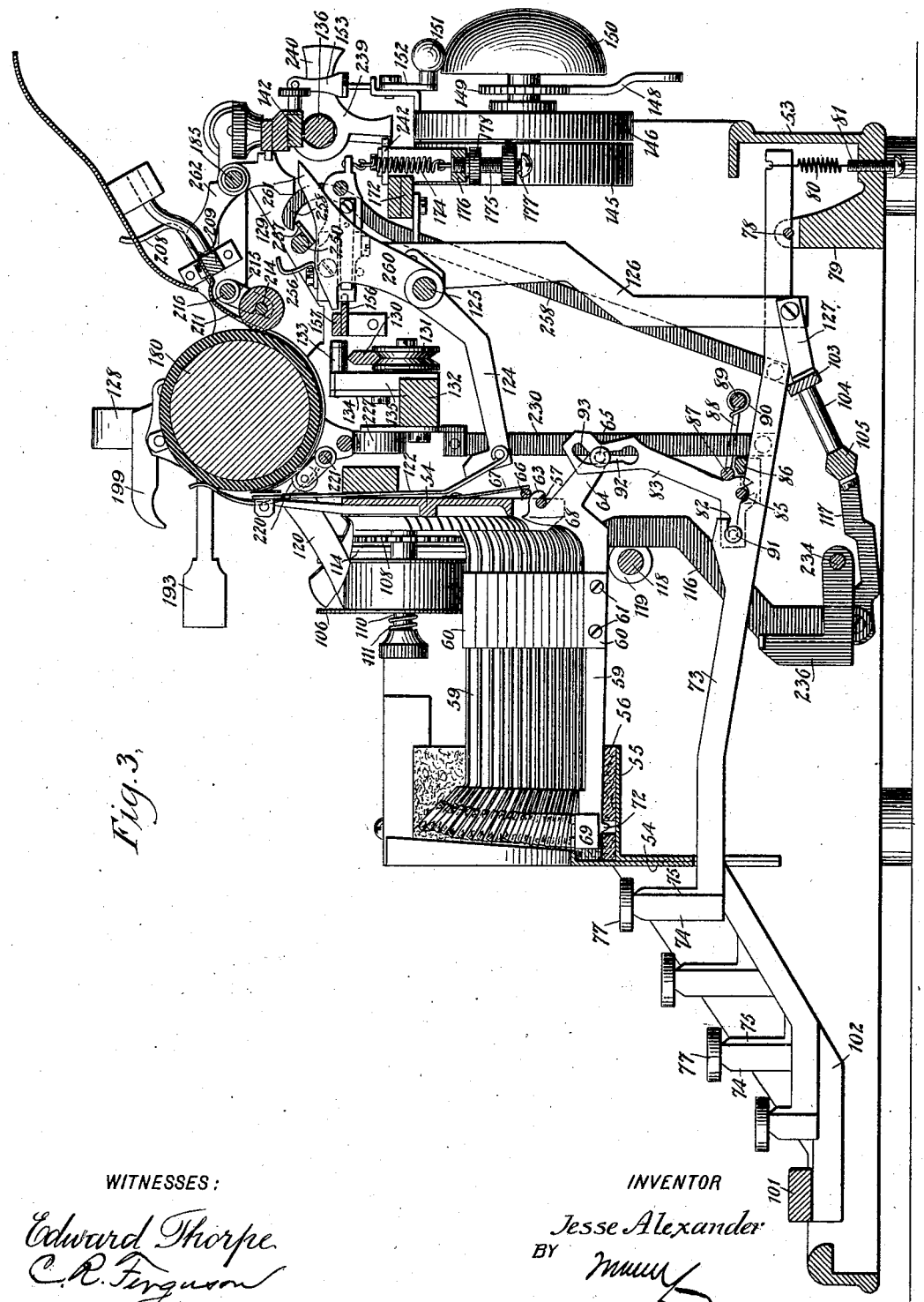

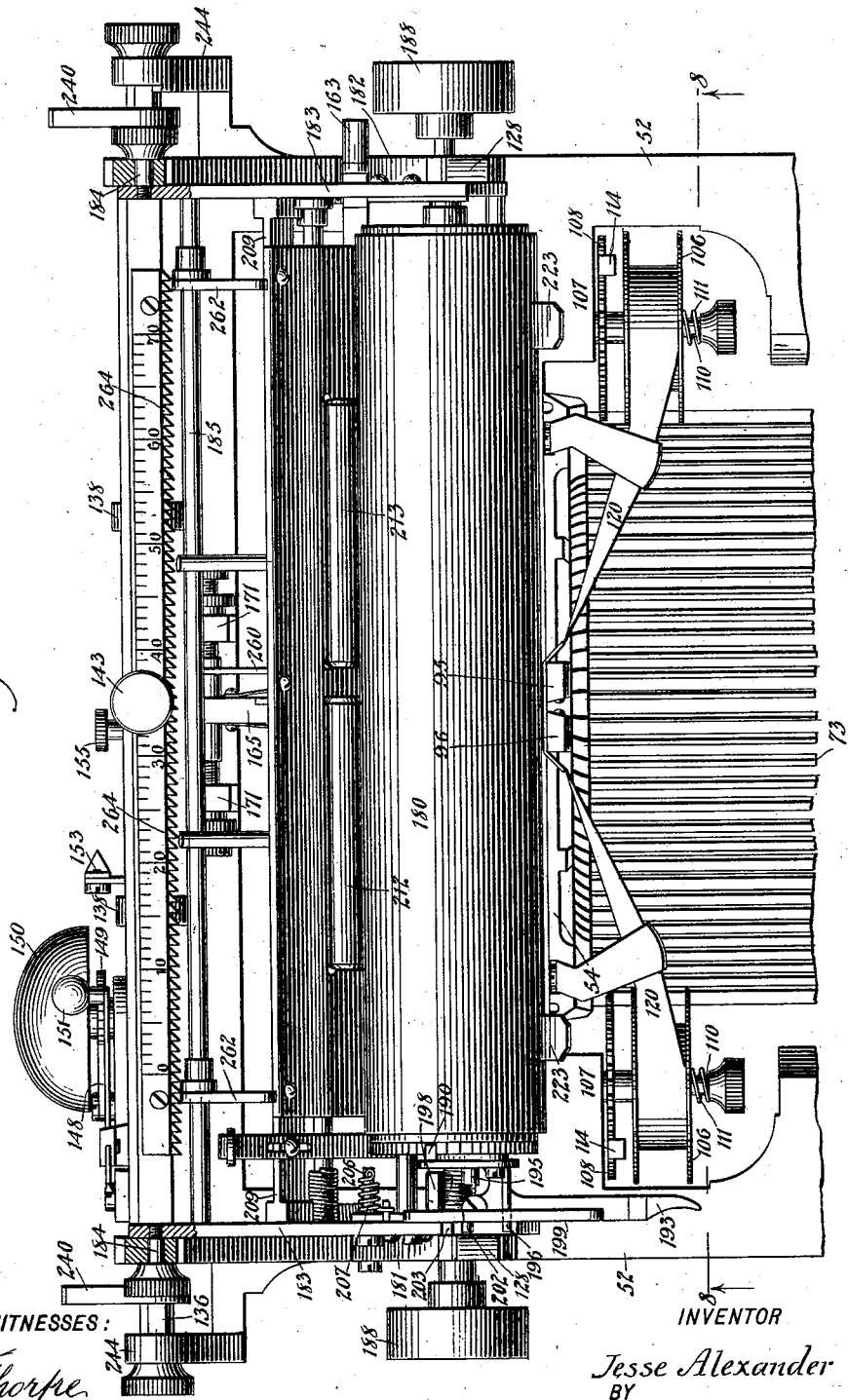

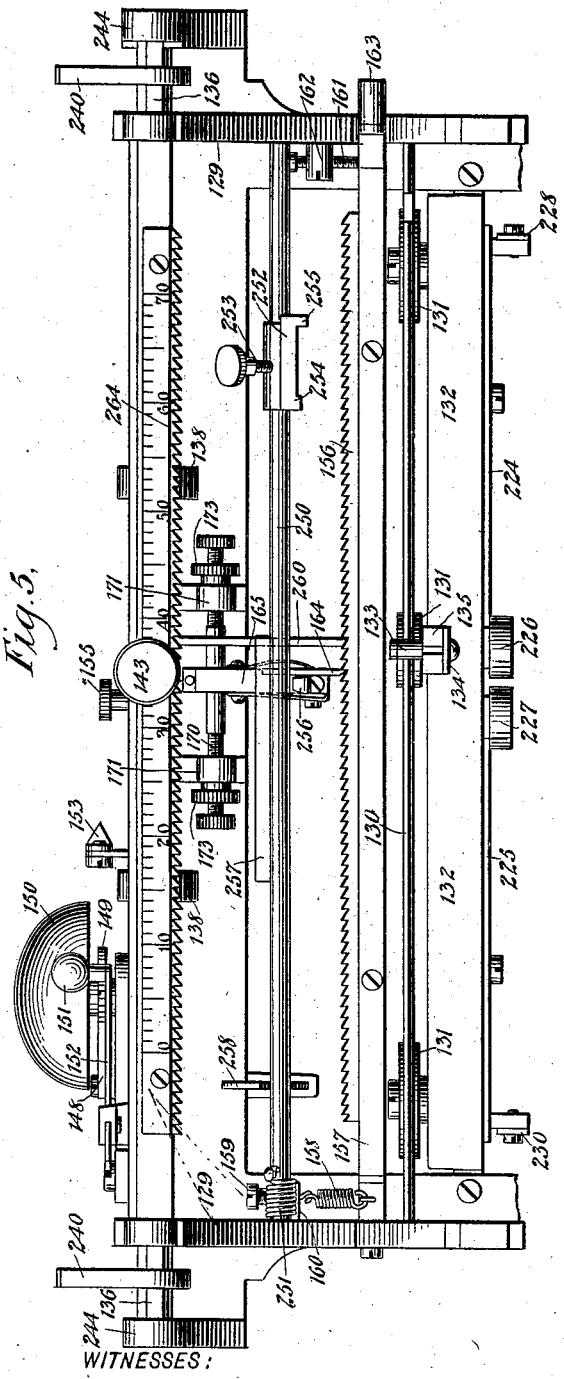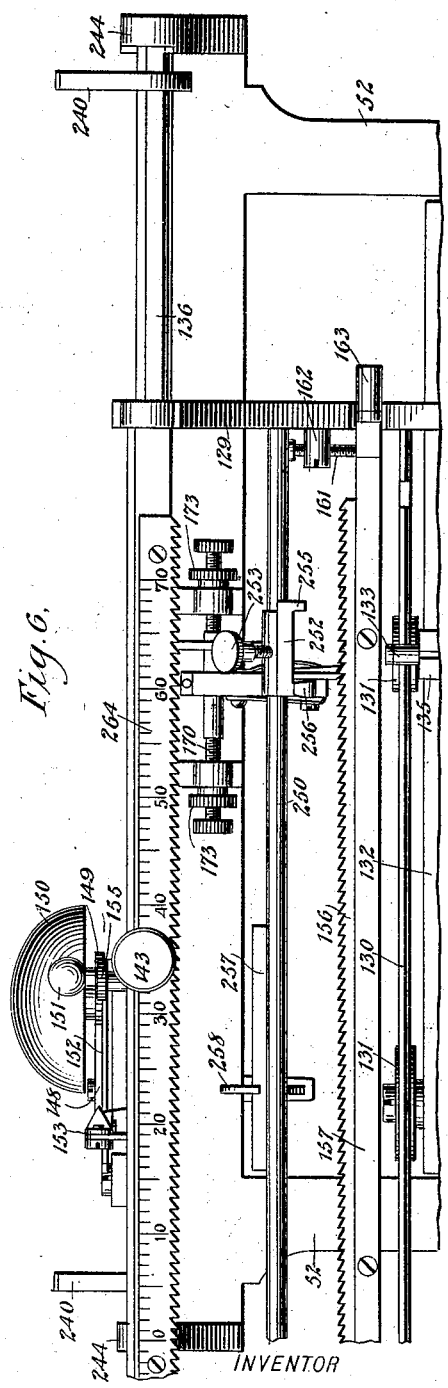

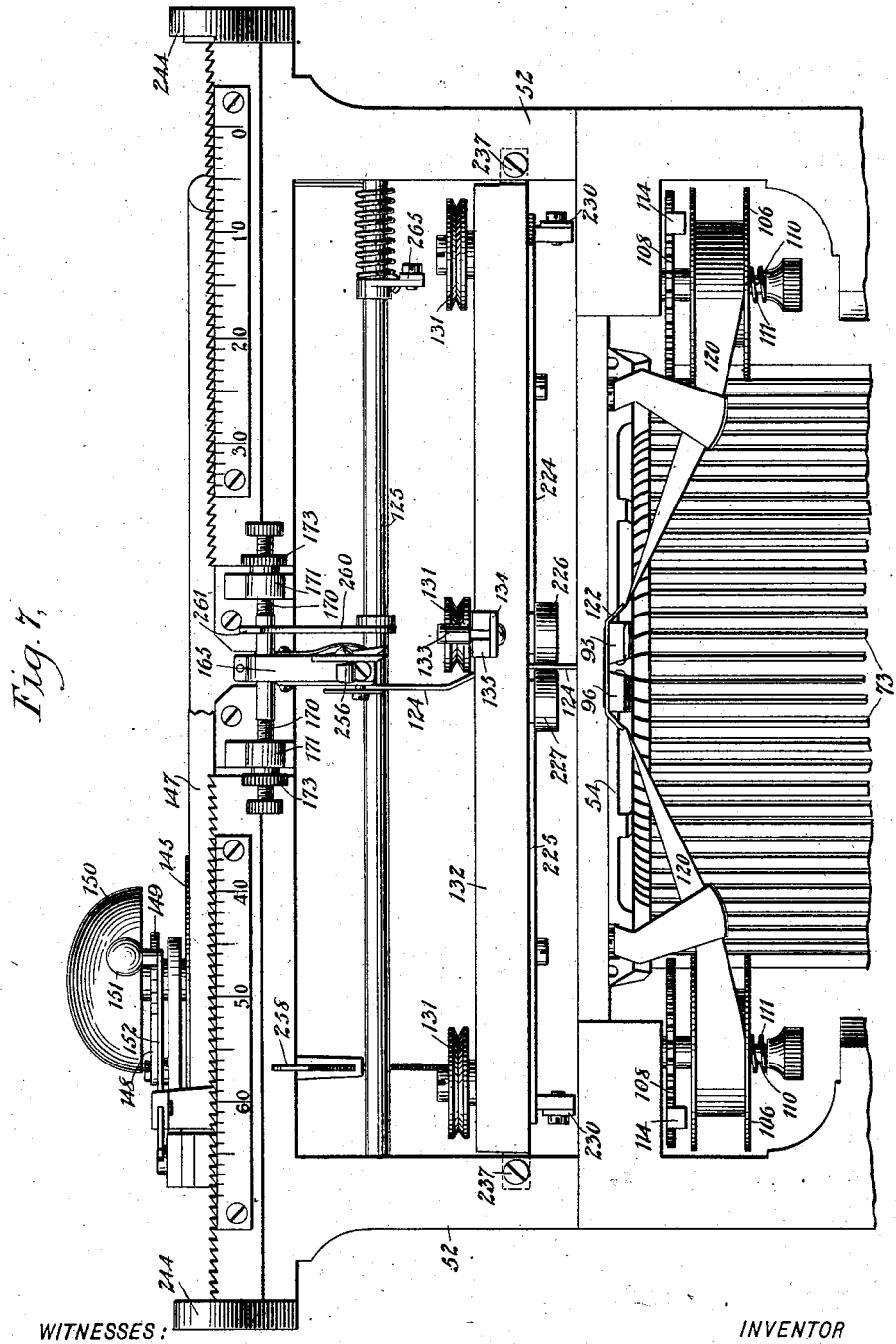

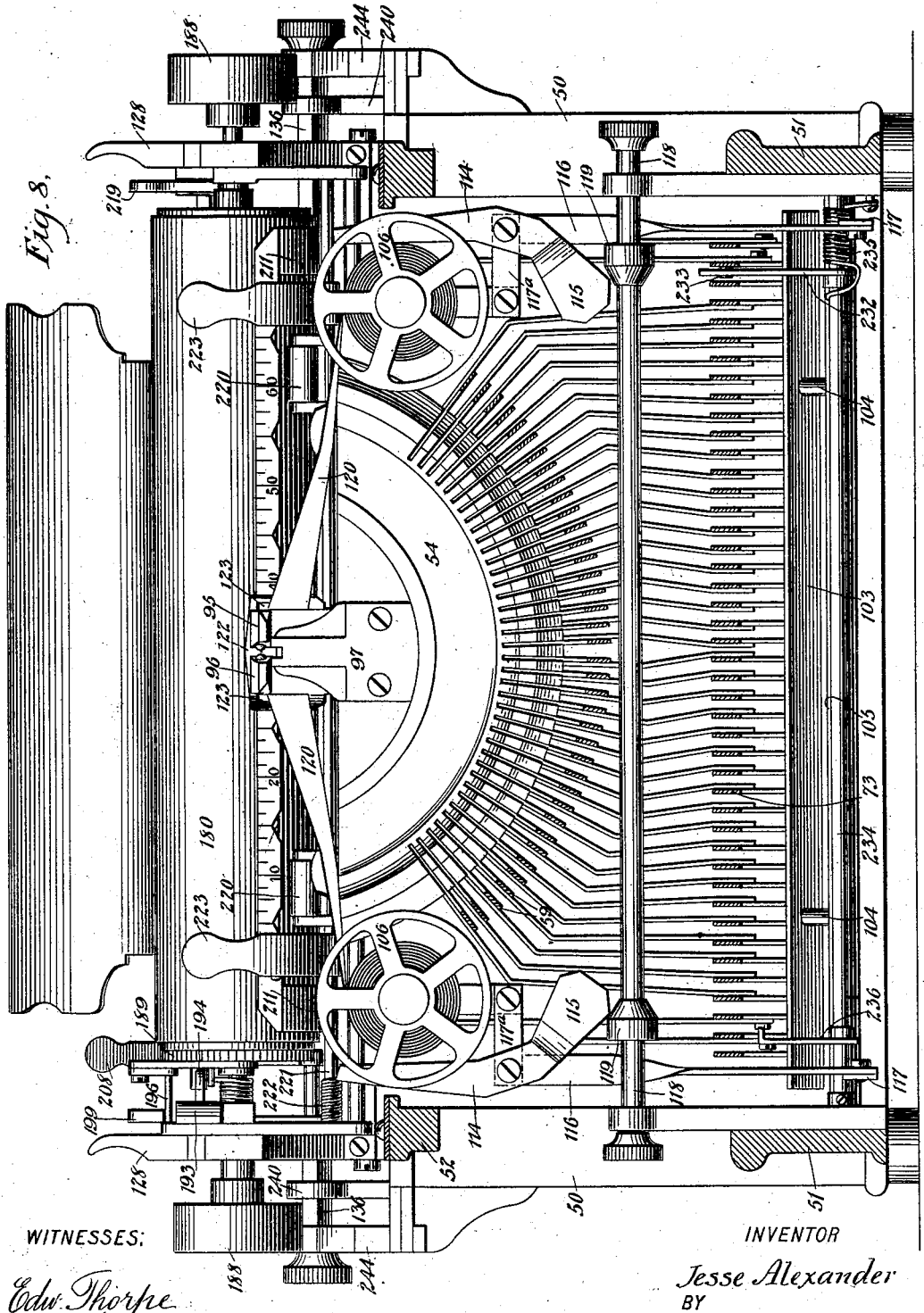

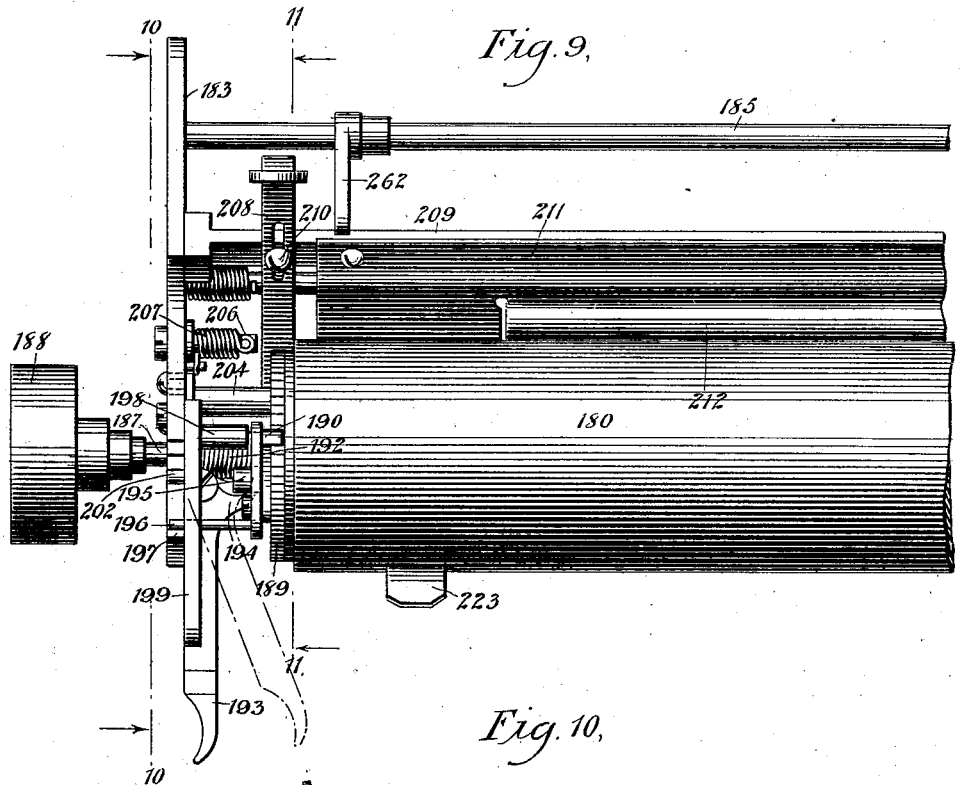
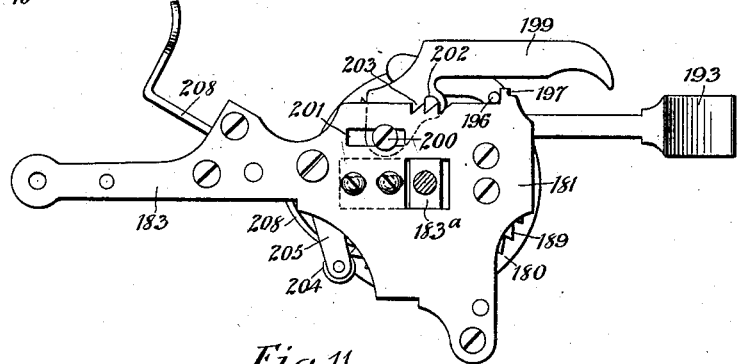
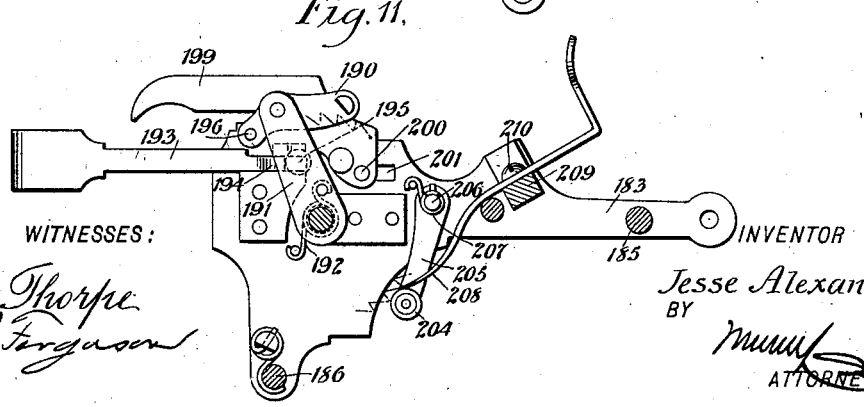

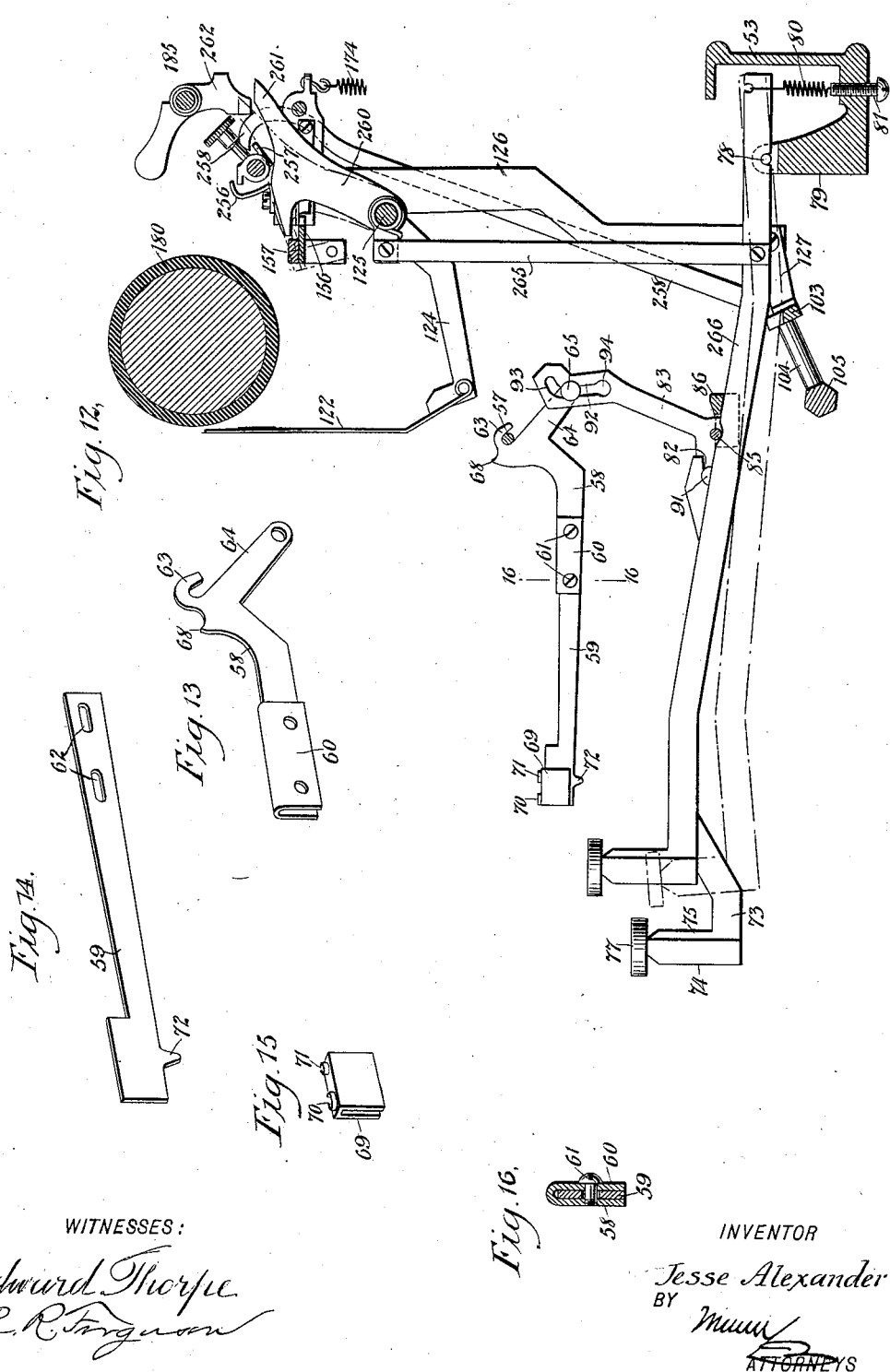

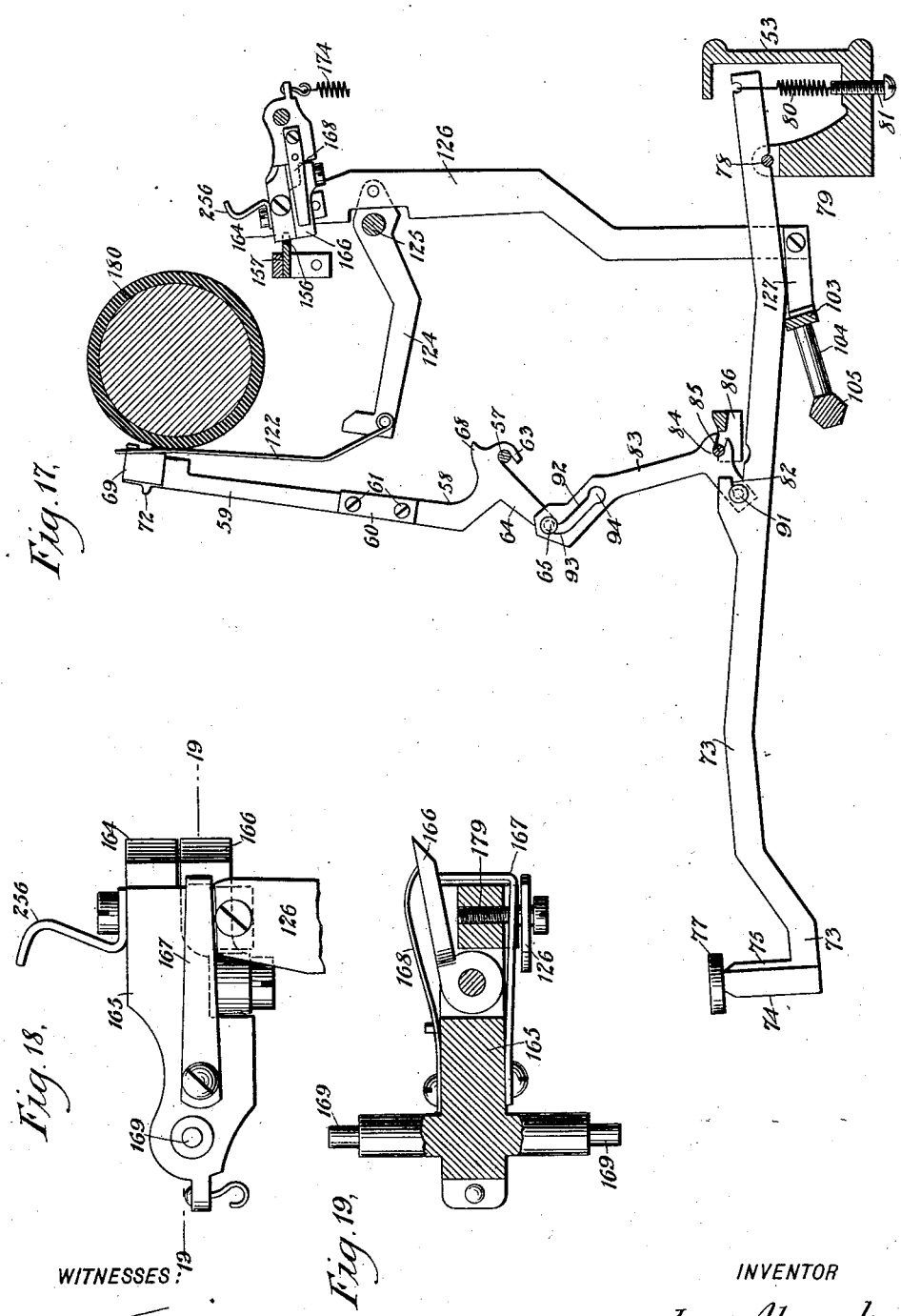

WITNESSES:
Edward Thorpe
C. R. Ferguson

INVENTOR
Jesse Alexander
BY
ATTORNEYS

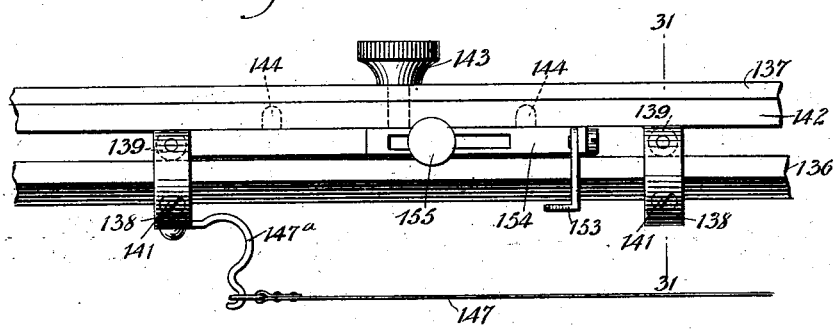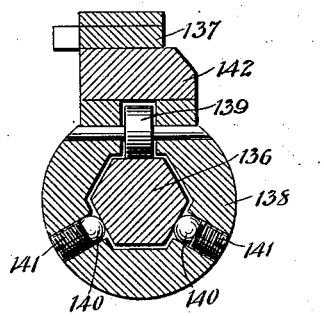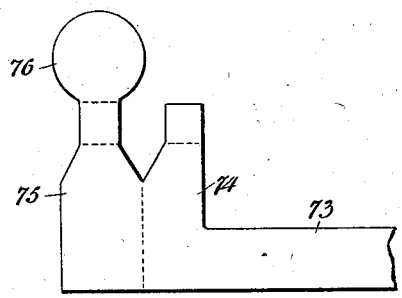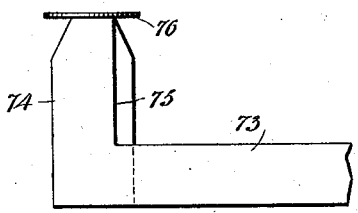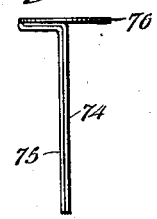

UNITED STATES PATENT OFFICE.

JESSE ALEXANDER, OF NEW YORK, N. Y., ASSIGNOR OF ONE-HALF TO
HERMAN BENKE, OF NEW YORK, N. Y.

TYPE-WRITER.

SPECIFICATION forming part of Letters Patent No. 724,772, dated April 7, 1903.

Application filed October 1, 1901. Serial No. 77,184. (No model.)

*To all whom it may concern:*

Be it known that I, JESSE ALEXANDER, a citizen of the United States, and a resident of the city of New York, borough of Manhattan, in the county and State of New York, have invented a new and Improved Type-Writer, of which the following is a full, clear, and exact description.

This invention relates particularly to improvements in carriage mechanism for type-writing machines; and an object is to provide a simple means for actuating a carriage and limit its movements.

Other objects of the invention will appear in the general description.

I will describe a type-writer embodying my invention and then point out the novel features in the appended claims.

Reference is to be had to the accompanying drawings, forming a part of this specification, in which similar characters of reference indicate corresponding parts in all the figures.

Figure 1:
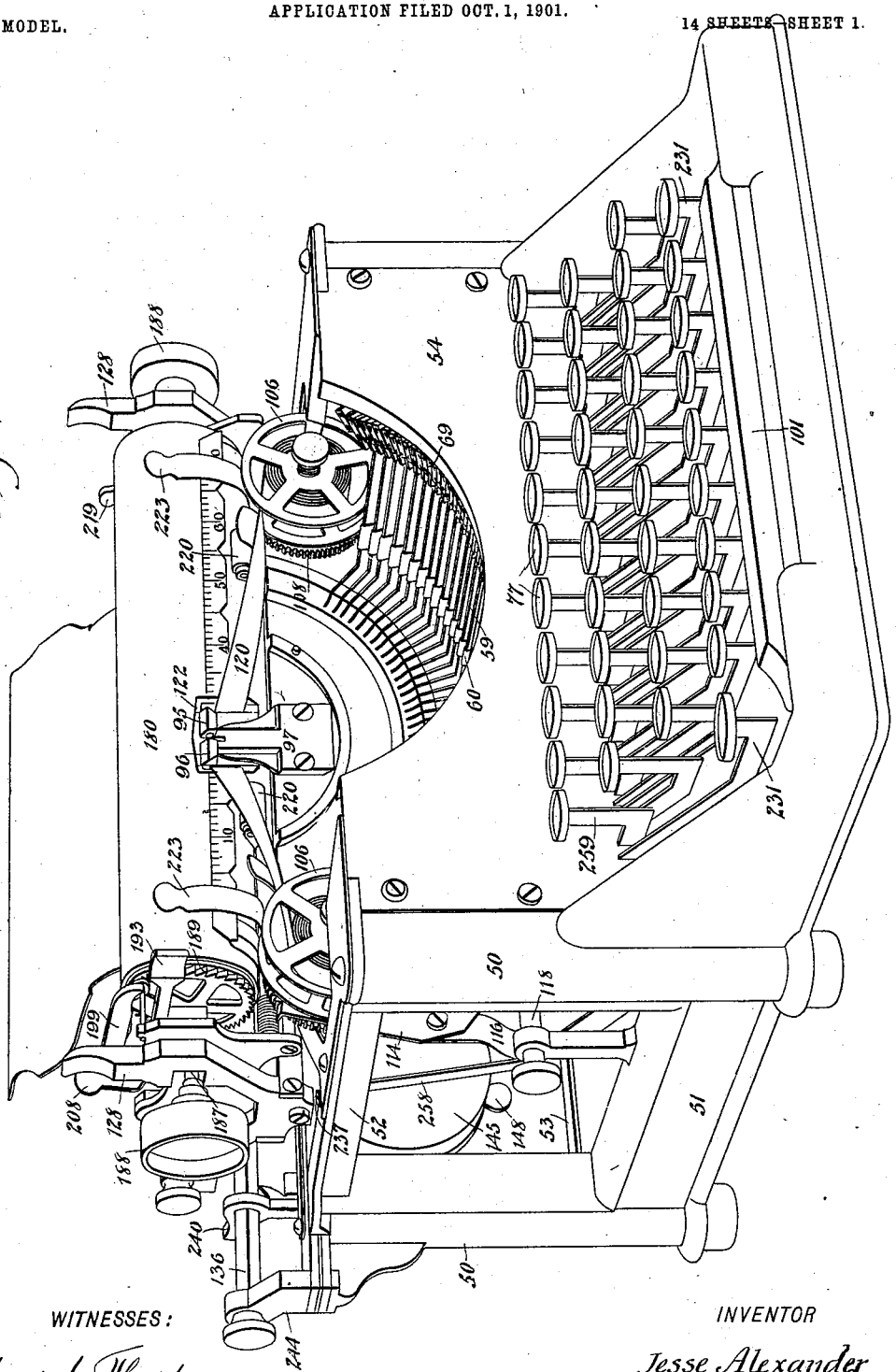
Figure 2:
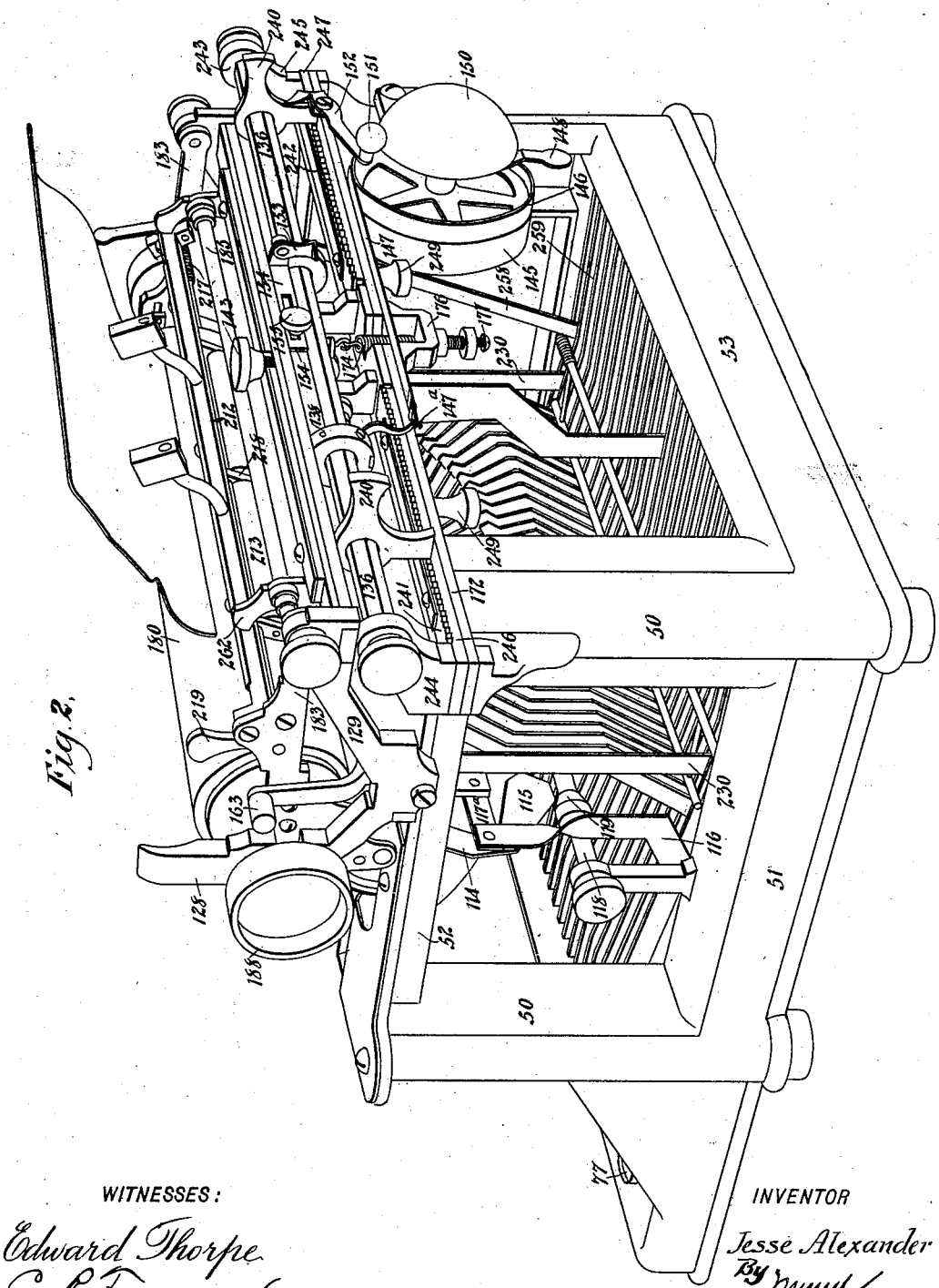
Figure 25:
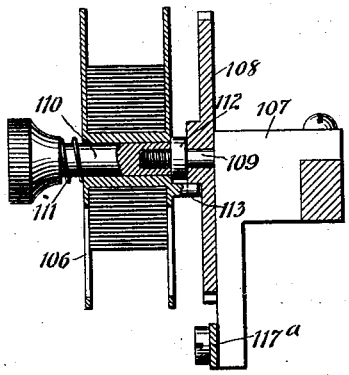
Figure 26:
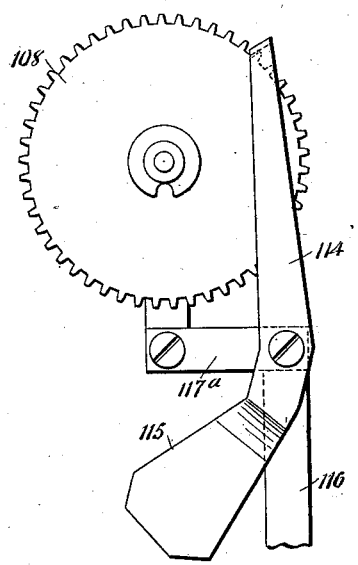
Figure 27:
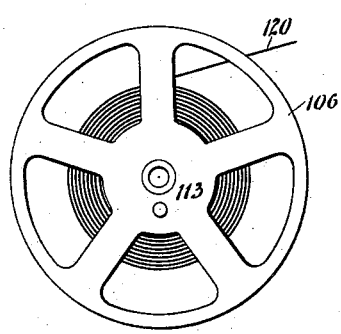
Figure 28:
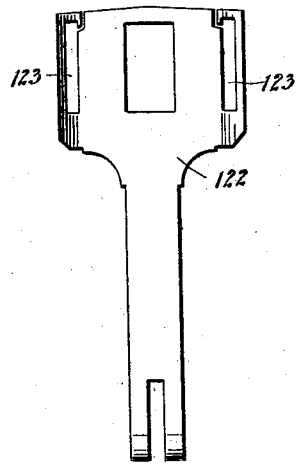
Figure 29:
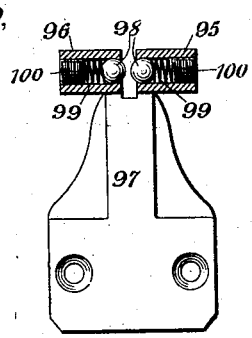

Figure 1 is a perspective front elevation of a type-writing machine embodying my invention. Fig. 2 is a perspective rear elevation thereof. Fig. 3 is a sectional elevation. Fig. 4 is a plan view. Fig. 5 is a plan view with the impression-roller removed. Fig. 6 is a similar view, but showing the parts in a different position. Fig. 7 is a plan with the carriage removed. Fig. 8 is a section on the line 8 8 of Fig. 4. Fig. 9 is a plan clearly showing the carriage-shifting mechanism. Fig. 10 is an end view and section on the line 10 10 of Fig. 9. Fig. 11 is a section on the line 11 11 of Fig. 9. Fig. 12 is a view showing the tabulating mechanism. Fig. 13 is a perspective view of a portion of a type-bar. Fig. 14 is a perspective view showing the other portion of the type-bar. Fig. 15 shows a type-block. Fig. 16 is a section on the line 16 16 of Fig. 12. Fig. 17 is a general view of the type-bar-operating mechanism. Fig. 18 is a side view of the carriage-movement regulator. Fig. 19 is a section on the line 19 19 of Fig. 18. Fig. 20 is a detail showing the means for elevating the impression-roller. Fig. 21 is a front view of a portion of the same mechanism. Fig. 22 is a detail showing means for adjusting the roller-lifting device. Fig. 23 is a plan showing a means for adjusting the machine for different lengths of carriages. Fig. 24 is a section on the line 24 24 of Fig. 23. Fig. 25 is a sectional view of one of the ribbon-spools. Fig. 26 shows the ribbon-spool-operating mechanism. Fig. 27 is a rear view of the ribbon-spool. Fig. 28 shows a ribbon-lifting device. Fig. 29 shows the type-bar guide. Fig. 30 is a detail showing the carriage track or rail. Fig. 31 is a section on the line 31 31 of Fig. 30. Fig. 32 shows a blank for forming a finger-lever. Fig. 33 shows the finger-lever as formed, and Fig. 34 is an end view thereof.

The frame of the machine comprises corner uprights or posts 50, connected at the ends and at the bottom by bars 51 and at the top by bars 52. The rear uprights or posts are connected at the bottom by a cross-bar 53, and arranged in the front of the frame is a front plate 54. The front plate 54 at the top has a semicircular opening, and inward of this opening is a segmental plate 55, upon which is a cushion 56, of felt or other suitable material, upon which the type-bars are designed to strike upon their return movement, thus causing practically no sound upon said return of the type-bars. The front plate 54 at its lower edge is kerfed to receive the fulcrum parts of the type-bars, the type-bars being fulcrumed on a rod or wire 57, extended along the rear side of the said front plate.

Each type-bar consists of a fulcrum-section 58 and a type supporting or bearing section 59, these sections being adjustably connected together. As here shown, the section 58 is provided with a portion 60, which is turned over and extends down parallel with the body of said section 58, and the said body and portion 60 form the side walls of a socket in which the end of the type-bar section 59 is inserted and is held by means of screws 61. These screws 61 pass through openings in the portions 58 and 60 and through slots 62 in the portion 59. By this construction the type-bar may be readily adjusted longitudinally to cause the type to strike at the proper place over the impression-roller. The section 58 of the type-bar is provided with a hook-shaped fulcrum-bearing 63, designed to engage with the fulcrum-rod 57, as clearly shown in Fig. 3, and extended downwardly and rearwardly from this fulcrum-bearing is an arm 64, on the end of which is a headed pin 65, designed to engage with an actuating angle-lever, as will be hereinafter described. The several type-bars are held yieldingly yet removably on the rod 57 by means of a spring-pressed rod or wire 66. This wire 66 is longitudinally curved and is attached at its ends to the springs 67, the said springs being attached to the frame of the machine. This wire or rod 66 not only serves for the purpose above described, but serves as a yielding abutment for the upward or striking movement of the type-bars by engaging with projections 68 on the said type-bars.

Attached to the free end of each type-bar is a type-block 69. This type-block 69 consists of a plate of metal bent to engage the upper edge of the type-bar and also to engage against the side thereof. It may be secured in any desired manner, such as by pressure or swaging or by soldering. On each type-block are the upper and lower case type 70 71. On the lower or outer edge of each type-bar, near its free end, is a projection or lug 72. This projection or lug is designed to prevent the striking of type of another type-bar against any type-bar that may be in printing position, and therefore the projection or lug is located at a position to engage between the type on a type-block.

The finger-levers 73 are each formed of a single sheet of metal, the blank for forming the same being clearly shown in Fig. 32. At the outer end this blank has an upwardly-extended portion 74 and an upwardly-extended portion 75. The portion 75 is designed to be folded against the portion 74 and then the upper ends of said portions 74 and 75 are to be turned at right angles or on a horizontal plane, after which a cap-plate 76 on the portion 75 is to be turned downward, and on this plate 76 the cap 77 is to be placed, the said cap having printed thereon letters, numerals, or other characters. The general construction of the finger-lever when formed is shown in Figs. 33 and 34. At the rear end the several finger-levers are fulcrumed on a rod 78, mounted on a bar 79 at the rear side of the machine-frame. This bar 79 is provided with slits or kerfs to receive the finger-levers, and the walls of said slits or kerfs will prevent to a great extent any lateral play of the levers. It will be noted that the bearings of the levers are in the form of notches, so that the levers may be readily removed when desired. The returning-springs 80 are connected at one end to the levers and at the other end to an adjusting-screw 81. By manipulating these screws 81 it is obvious that the tension of the springs may be readily adjusted. At the forward ends the several finger-levers are guided in slits formed in the lower edge of the front plate 54, and between its ends each lever is provided with a hook-shaped bearing 82.

Each finger-lever is connected to its type-bar by means of an angle-lever 83. These several angle-levers have fulcrum-bearings 84, which open outward, and these bearings receive a fulcrum-rod 85, mounted on the upper side of a comb-plate 86, extended across the machine-frame. The several angle-levers are held removably on the fulcrum-rod by means of a holding-bar 87, attached, by means of arms 88, to a rock-shaft 89, with which one end of a spring 90 connects, the other end of said spring engaging with the machine-frame. The forwardly-disposed lower member of the angle-lever 83 is provided with a headed pin 91 for engaging in the bearing 82, and the upper end of the upwardly-disposed portion of the angle-lever is provided with a slot 92 to receive the pin 65. The greater portion of this slot 92 has straight side walls. The upper portion, however, is curved rearward and upward, as at 93, and at the lower end of the slot is an enlargement 94, through which the head of the pin 65 may readily pass.

By the construction of the connections between the type-bar and finger-lever and angle-lever it is obvious that the several parts may be readily assembled or may be readily detached for replacement by others should occasion require from wear or other cause, and this, of course, without disturbing other portions of the machine.

To cause the type at all times to strike on the proper place or in proper alinement on the paper, I provide a guide just forward of the impression-roller and consisting of tubular members 95 96, the space between the adjacent ends of which is sufficient to permit the end of the type-bar to pass through. These tubular members are mounted on the upper end of a post 97, attached to the front plate 54. Arranged in the inner end of each tubular member and projecting slightly outward therefrom is a movable bearing device, here shown as a hard-metal ball 98. These balls are prevented from moving too far outward by crimping or swaging the ends of the tubes. The balls are pressed yieldingly toward each other by means of springs 99, arranged in the tubes, and as a means for adjusting the tension of the springs I employ screws 100, which engage in the outer portions of the tubes. It is obvious that by adjusting the tension of one spring slightly greater than the other the pressure of the ball at one side of the type-bar will be greater than at the other, this having a tendency to press the type-bar toward said weaker side, which may be found necessary during some adjustments; but of course the tension of the two springs may be made equal.

Having described in detail the type-bars and their actuating devices, I will now describe a means for feeding the ink-ribbon, it being understood that the feed is by step-by-step motion upon the operation of each type-bar or by the spacing-bar. The spacing-bar 101 is arranged along the front of the machine in the usual manner and attached to the forward ends of arms 102, which extend along the inner side of the machine-frame and are fulcrumed at their rear ends on posts, these arms 102, as do also the several finger-levers, passing over and engaging upon a universal lifting-bar 103, attached, by means of arms 104, to a rock-shaft 105, having bearings at its ends in the machine-frame.

The ribbon-feeding device consists of spools 106, mounted on inwardly-extended arms 107 in the machine-frame, and rearward of each spool is a ratchet-wheel 108. The ratchet-wheels 108 are mounted to rotate on studs 109, attached to the said arms 107, and the spools 106 are attached to the studs 109 by means of spindles 110. These spindles are interiorly screw-threaded to engage the exterior screw-thread on the studs 109, and between the head of the spindle 110 and the spool is arranged a spring 111, which serves to hold the spool yieldingly against a collar 112 on the stud. Each spool 106 is caused to rotate with its ratchet-wheel 108 by means of a pin 113, attached to the spool and engaging in a notch in the hub portion of the ratchet-wheel. By this construction the spool may be readily detached from its ratchet-wheel when desired.

A gravity-operating dog 114 is provided for each ratchet-wheel 108. This gravity-dog has a rearwardly-extended upper end for engaging with the teeth, and its lower end 115 is so weighted as when released to cause the hook portion of the dog to engage with the teeth— that is, these weighted portions are inclined inward and downward. The gravity-dogs 114 are connected by links 116 to arms 117, extended forward from the rock-shaft 105, the upper ends of said links 116 being pivotally connected to one end of links 117$^a$, the opposite ends of said links 117$^a$ being pivoted to hangers in the machine-frame, the dogs 114 being mounted on the pivots connecting the parts 116 and 117$^a$.

Mounted to slide in bearings in the machine-frame is a bar 118 for shifting the dogs 114—that is, for so shifting the dogs that one will be placed in operative position, while the other is placed in inoperative position. This shifting-rod 118 is provided with finger-pieces at its ends, and it is also provided near its ends with collars 119 for engaging the weighted ends of the dogs 114. In Fig. 8 this bar 118 is shown as shifted to the right, thus leaving the dog 114 at the right-hand side of the machine to operate the spool at said right-hand end and draw the ribbon 120 from the other spool. The collar 119 at the left-hand end of said rod, however, by engaging with the weighted end of the dog 114 at said end will move and hold said dog out of operative position. When the parts are in the position thus described, a downward pressure on any one of the keys or the spacing device will cause a rocking of the rock-shaft 105, which will move the dog 114 upward, and upon releasing the key the dog will move downward, causing it by engaging with a tooth of the wheel 108 to move the ribbon-spool one space. Upon releasing the finger-lever the rock-shaft will be returned to its normal position, consequently moving the dog upward for engagement with another tooth. To cause a quick return of the rock-shaft 105, I may employ a spring 121, which is coiled around said rock-shaft near one end and is connected at one end to the rock-shaft and at the other end to a pin on the machine-frame. When it is desired to turn the spools to quickly adjust the ribbon, said spools may be drawn out against the resistance of the springs 111, releasing the pins 113 from the ratchet-wheels 108.

At its central portion the ribbon 120 passes through a guide and lifting plate 122. This guide-plate has a central opening through which the ribbon may be pressed against the paper, and it has side slots 123, the walls of which provide guides for the ribbon. These slots 123 have upward and outward openings through which the ribbon may be readily passed. At each depression of a finger-lever the plate 122 is carried upward to bring the ribbon in line with the type. The lower end of the guide-plate 122 is pivotally connected to an arm 124, loosely mounted on a rock-shaft 125, supported in the machine-frame, and this arm 124 has a projection rearward of the rock-shaft with which a draw-rod 126 connects, the lower end of this draw-rod being connected pivotally to an arm 127, extended rearward from the universal lifting-bar 103.

I will now describe the impression-roller carriage and its operating mechanism. The carriage comprises end pieces having at the front upwardly-extended portions 128 and rearwardly and upwardly extended portions 129. These end portions are connected by a rail 130, which is mounted to run, as here shown, on three rollers 131, attached to a bar 132, extended across the machine-frame. These rollers 131 are grooved and the bottom edge of the rail is correspondingly shaped, and to prevent any possible upward swinging movement of the carriage I employ a holding-roller 133, which is placed over the center roller 131. This holding-roller 133 is vertically adjustable, so that it may be moved downward to properly engage the rail 130 as the parts are subject to wear. This roller 133 is mounted on a stud connected to a plate 134, through an opening in which a screw passes into a post 135, extended from the bar 132.

The rear portion of the carriage moves on a track or rail 136, which is made angular in cross-section. Attached to the back cross-bar 137 of the carriage are collars 138, which engage around said track or rail 136, and to reduce friction to a minimum between the collars and the rail I employ in each collar 138 an antifriction-roller 139, which bears upon the upper surface of the track or rail, and against opposite sides of the lower portion balls 140 engage. These balls 140 are passed through openings formed in the collars and are held in place by means of screws 141, the inner ends of these screws being cupped to receive the balls. Instead of attaching the collars 138 directly to the bar 137 I preferably attach them to a plate 142, which is attached to the bar 137 by means of a thumb-screw 143, and to prevent the plate 142 from turning on the screw it is provided with lugs 144, which engage in recesses formed in the bar. The object in making the collars detachable from the rail 137 is to provide for the adjustment of a longer carriage, as will be hereinafter described.

The carriage is moved in one direction—that is, to the left—by means of a spring arranged in a barrel 145, one end of which is attached to a wheel 146, while the other end is attached to the barrel. A metal ribbon 147 is attached at one end to the wheel 146 and at the other end to a finger $147^a$ on one of the collars 138. The spring may be wound by turning the shaft supporting the barrel 145 and held as wound by means of a dog 148, engaging with a ratchet-wheel 149 on the shaft. Mounted on the shaft is a gong 150, adapted to be sounded by a striker 151, attached to a swinging arm 152 and having an upward extension designed to be engaged by a tappet 153, attached to the plate 142. This tappet 153 has swinging connection with a plate 154, adjustable on said plate 142 and held as adjusted by means of a set-screw 155, passing through a slot in said plate 154. This adjustment will be found necessary to ring the bell at a desired time or in accordance with the width of the sheet of paper.

As a stop or controlling device for the movement of the carriage to the left I provide a rack 156, the teeth of which are ratchet-shaped, and this rack is attached to a bar 157, mounted to rock on the carriage. The rack is held normally in position by means of a spring 158, connected at one end to the bar 157 at one end of the machine, and at the other end the spring is attached to a screw 159, adjustably mounted in a lug 160, and its forward movement is limited by a screw 161, mounted in a lug 162. By moving this screw 161 inward or outward it is evident that the rearward throw of the bar may be regulated. At one end the bar 157 has an upwardly-extended crank or handle 163, by means of which the rack may be swung upward out of engagement with the holding and controlling devices, to be hereinafter described, when it is desired to move the carriage quickly to the left.

The retarding and controlling mechanism for the carriage consists of a retarding-dog 164, rigidly mounted on an arm 165, and a governing-dog 166, mounted below the dog 164, so as to swing slightly on a horizontal plane. Pressing against one side of the dog 166 is a spring 167, and pressing against the other side of said dog is a lighter spring 168, which serves to return the dog 166 to normal position, the other spring operating to force the dog in the opposite direction. These two springs are attached to the arm 165. The arm 165 has trunnions 169, which have bearings in longitudinal openings formed in screws 170, operating in uprights 171 on the back cross-bar 172 of the machine-frame. These screws 170 permit of lateral adjustments of the arm 165, and the screws may be held as adjusted by jam-nuts 173. One end of a spring 174 connects with a portion of the arm 165, rearward of its pivotal point, and the other end of this spring connects with a screw 175, adjustable in a yoke or hanger 176. As here shown, the lower end of the spring 174 instead of connecting directly with the screw 175 is connected to the end of a screw 177, engaging with the interior thread of the screw 175. This is for causing fine adjustments of the parts, and when the screw 175 is adjusted it may be held in such position by means of a jam-nut 178. The upper end of the draw-rod 126, heretofore described, has pivotal connection with the forward end of the arm 165. In the operation of this retarding and governing device when any one of the finger-levers or the spacing-bar is moved downward the arm 165 will be swung downward until the governing-dog 166 passes beneath and is disengaged from a tooth of the rack 156. At this time the upper fixed dog 164 will engage with the tooth previously engaged by the dog 166, holding the carriage in position until an impression shall have been made by a type, and at this time the spring 167 will force the dog 166 to the right underneath the next tooth of the series on the rack. Then as the finger-lever is released and the arm 165 moved upward by means of its spring the dog 164 will be released, permitting the carriage to move one step as the dog 166 engages with said next tooth of the series and stops the carriage. The throw of the dog 166 by means of the spring 167 may be regulated by a screw 179, seated in the arm 165 and bearing against said spring, as plainly shown in Fig. 19. As before stated, the spring 168 is lighter or has less pressure than the spring 167, and therefore it will offer no obstruction to the operation of said spring 167. It will, however, prevent the dog 166 from moving too far or rather return it to normal position when the said dog is deflected by moving the carriage to the right.

Having described the carriage, its movements, and means for causing the movements, I will now describe the impression-roller mounted on the carriage. The impression-roller 180 has its trunnion-bearings in a frame comprising end plates 181 and 182, from which arms 183 extend rearward. The rear ends of these arms are pivotally connected to the rearward extensions of the carriage. As here shown, these pivotal connections consist of thumb-screws 184, which have plain portions bearing in the said extensions of the carriage and screw-threaded portions engaging in the arms 183. The opposite arms 183 are connected by a cross-bar 185, and the forward portions of the side plates are connected by a cross-bar 186. To permit of a back and forth adjustment of the roller for regulating the strike pressure of the type, its trunnion-bearings are arranged in blocks 183ª, slidable in the end plates and held as adjusted by means of screws.

The frame carrying the roller has a slight vertical movement at its front, so as to make the proper changes for upper and lower case type printing. Therefore the trunnions extend through slots or openings 187 in the uprights 128 of the carriage. The ends of the trunnions are provided with finger-pieces 188, by means of which the roller may be quickly adjusted when desired. On one end of the roller is a ratchet-wheel 189, designed to be engaged by a dog 190, mounted to rock on a trunnion of the roller. As here shown, this dog 190 is connected to an arm 191, mounted on said trunnion, and the arm is thrown in one direction by means of a spring 192, coiled around the trunnion and connected at one end to a pin on the end plate and at the other end to the said arm 191.

Mounted to swing on a horizontal plane and pivotally connected to a block or lug on the end plate 181 is an operating-arm 193 for causing a movement of the dog to impart a step-by-step motion to the impression-roller. This arm 193 has a finger 194, adapted to engage with a pin 195 on said arm 191. By throwing the free end of this arm 193 to the right the dog will be moved to impart a motion to the impression-roller. Upon releasing the said arm the dog will be drawn back, while the roller remains stationary, by means of the spring 192, and it will be raised free of the ratchet in its back movement by means of a pin 196 engaging with a stop-lug 197 on the said plate 181, so as to permit free movement in either direction of the impression-roller. It may be here stated that by means of this same arm 193 the carriage may be moved to the right by a continued pressure on said arm.

To provide for different spacings for lines, I employ an adjustable stop. This stop consists of a lug 198, adapted to be engaged by a pin 195 on the arm 191. The lug 198 is attached to a lever 199, having a pin or screw 200, movable in a slot 201, formed in the plate 181. At its outer side the lever 199 has a projection or lug 202, adapted to engage with any one of a set of three teeth 203, formed on the upper edge of said plate 181. Obviously by adjusting this lever a greater or less throw will be permitted to the dog for actuating the impression-roller.

It is sometimes necessary to move the impression-roller with the paper backward to a former line or lines, and I therefore provide an audible signal to indicate the number of spaces or lines thus moved back. This audible signal consists of a roller 204, adapted to engage with the ratchet-wheel 189 and cause a slight click against the teeth as the wheel is turned. This roller 204 is supported on an arm 205, mounted to swing on a stud 206, and a spring 207, engaging at one end with the arm 205 and at the other end with a pin on the plate 181, serves to hold the roller 204 yieldingly against the ratchet-wheel. When this audible signal is not desired, it may be moved and held out of engagement with the ratchet-wheel by means of a plate 208, mounted to slide on a bar 209, the said bar having T-shaped ends connected to the opposite end plates and which will prevent any possible swaying movements of the plate. As here shown, a screw 210 passes through a slot in the plate 208 and engages in said bar 209. When the plate is moved downward, it will engage with the roller, pressing it outward, and consequently out of engagement with the ratchet-wheel. The said plate, however, at this time will bear slightly on the end of the roller, so as to serve somewhat as a brake to prevent accidental movement.

It will be noted that the pivotal points of the arms 183 are at a point slightly above the plane of a line drawn horizontally intermediate of the upper and lower case type. Therefore when the impression-roller is in its lowermost position the lower type will strike solidly thereon, and also when the impression-roller is moved to its upper position the arc of a circle will be such that the upper-case type will be caused to strike squarely on the paper supported on the roller.

The paper is guided and held around the under side of the impression-roller by means of a plate 211, curved substantially to the form of the roller and having its rear edge attached to the bar 209. Pressure-rollers 212 and 213 are extended slightly through slots in the rear portion of the plate 211, so as to engage with the paper and press it firmly against the impression-roller. These pressure-rollers 212 213 are mounted on a rod 214, which at its ends is supported in hangers 215, supported on a rock-shaft 216, which has bearings in the end portions of the roller-frame. By means of a spring 217, connecting at one end with said rock-shaft 216 and at the other end with one of the end plates, the rollers 212 and 213 are caused to press yieldingly against the paper. For the purpose of easily removing the rollers 212 213 the sockets in the hangers 215 have outward openings, (clearly shown in Fig. 3,) and the rod 214 is prevented from accidental movement out of said hangers by means of a spring-plate 218 engaging with said rod between the two rollers and hooking slightly underneath the same, the said part 218 being attached to the rock-shaft 216. A finger-piece 219 is attached to one end of the rock-shaft, so that it may be readily swung to disengage the pressure-rollers from the paper when the paper is to be removed or inserted. I also employ pressure-rollers at the front of the impression-roller. These front pressure-rollers 220 are supported in arms attached to a rock-shaft 221, which has one end of a spring 222 attached to it, the other end of the spring being secured to one end of the roller-frame. The plate 211 is provided with openings through which the said front pressure-rollers may pass. Extended upward from the rock-shaft 221 are fingers 223, designed to hold the paper against the roller above the point struck by the type. These holding-fingers 223 are adjustable longitudinally of said shaft 221, and to prevent their turning thereon the openings through which the shaft passes are made angular, while the shaft is correspondingly shaped. The adjustments of the fingers 223 toward and from each other adapt the machine to different widths of paper or to envelops or the like.

I will now describe the means for raising the impression-roller to bring the paper in position for upper-case letters. Mounted to swing on the bar 132 are levers 224 and 225, which at their inner adjacent ends are provided with rollers 226 227, which normally engage with the cross-bar 186. From the outer end of the lever 224 a draw-bar 228 extends downward and connects with a lifting or shifting lever 229, mounted in a similar manner to the finger-levers first described. From the outer end of the lever 225 a draw-rod 230 extends downward to a connection with another lifting or shifting finger-lever 231 at the left-hand side of the machine. It is designed that by a downward pressure on the lever 229 the impression-roller will be held elevated for any desired length of time or when it is desired to print a line wholly in capitals. This upward position is indicated in full lines in Fig. 20. When the roller is to be temporarily lifted, however, the key 231 at the left-hand side of the machine is to be depressed. By depressing either one of said levers its lever 224 225 will be raised, consequently elevating the impression-roller with its frame.

As a means for holding the lever 229 downward for the purpose above described I employ a latch 232, designed to engage with a pin 233 on one side of said lever 229. This latch 232 is attached to a rock-shaft 234, which is held yieldingly by means of a spring 235, connected at one end to the shaft and at the other end to a fixed portion of the machine-frame. The rear edge of the latch 232 above its hook portion engaging with the pin is inclined upward and forward, so that the latch will be deflected upon a downward movement of the lever 229 and the pin engaging with said inclined portion. On the opposite end of the rock-shaft 234 is an arm 236, which projects upward into the line of movement of the lever 231. Therefore when it is desired to release the latch from the pin 233, permitting the impression-roller to fall to its normal position, a downward pressure of the lever 231 by engaging with said arm 236 will rock the shaft 234, and consequently move the latch 232 out of engagement with its pin. It may be here stated that the bar 132, upon which the levers 224 and 225 are mounted, has a yielding connection with the machine-frame and is adjustable up and down, so that the lifting movement may be readily adjusted relatively to the frame in which the impression-roller is mounted. As shown in Fig. 22, the said bar 132 is connected to the frame by means of screws 237, which pass loosely through openings in the frame, and springs 238 are arranged between the top of the bar and the under side of the frame portion, these springs surrounding the screws.

To limit the length of carriage movement, or rather to cause it to stop at any desired length of line, I employ stops, here shown in the form of plates 239, having weighted finger-pieces 240, whereby they will fall to stopping position by gravity. These plates are movable on the rail 136 and are designed to engage with rack-plates 241 and 242. As has been before stated, it is designed that the machine may be adjusted for different lengths of carriages and impression-rollers. Therefore the rail 136 is secured, by means of screws 243, to brackets 244 245, attached to plates 246 247, mounted to slide on the back bar or rail 172, and these rack-plates 241 and 242 are attached to the plates 246 and 247. As clearly shown in Figs. 23 and 24, the plates 246 and 247 are provided with pins 248, which pass into slots formed in the plate or bar 172, so that said plates may be moved outward or inward, and they are held as adjusted by means of thumb-screws 249, which also pass through slots in said plate or bar 172 and engage with the plates 246 247. The plates 241 242 will be suitably graduated, or these graduations may be placed on other plates secured to said plates 241 242. The adjustment is made by moving a stop or both stops to proper position for the width of paper and then permitting it to drop to engage with the racks, and obviously as the carriage moves in either direction the collars 138 will engage with said stop-plates.

I will now describe a means for stopping the carriage and locking the several finger-levers from operation at any desired point— such, for instance, as at a point where a word is to be carried to the next line, or rather a portion of a word. Mounted in the machine-frame rearward of the impression-roller is a rock-shaft 250, which is moved after being rocked to its normal position by means of a spring 251, fastened at one end to said shaft and at the other end to the main frame. Adjustable longitudinally on the shaft 250 is a stop-block 252, which is held as adjusted by means of a set-screw 253. At its end toward the center of the machine this block has a forwardly-projecting tooth 254, and at the other end is a forwardly-projecting tooth 255, somewhat longer than the first-named tooth. Carried on the arm 165 is a hook-shaped spring-yielding finger 256, designed to engage with the tooth 254, as will be hereinafter described. At its rear side near one end a plate or wing 257 is attached to the rock-shaft 250, and this plate or wing is designed to be engaged by the hook end of a draw-rod 258, the lower end of which is connected to a finger-lever 259. In the operation as the carriage moves to the left and upon the spring-finger 256 reaching the block 252 the said spring-lever will engage upon the top or upper side of the tooth 254, and thus the arm 165 will be prevented from downward movement, or, in other words, the several finger-levers will be locked, thus notifying the operator that the point has been reached where a word is to be divided or that a few more letters may be added to the word. To release the finger-levers, the finger-lever 259 is to be depressed, and as the hook end of the draw-rod 258 now engages with the plate 257 a downward movement of the draw-rod will rock the rock-bar 250, and consequently move the tooth 254 out of engagement with the spring-finger 256. Then the machine may be operated to fill in the word and until the spring-finger 256 engages with the inner edge of the tooth 255, which will prevent further movement.

I will now describe a means for permitting a quick forward movement of the carriage to any desired distance and which will be found useful in tabulating or similar work. This means comprises a hook-shaped plate 260, mounted on the shaft 125 and adapted to engage when said shaft is rocked with the bar 157, to which the rack 156 is connected, and the said plate 260 is provided with an upwardly and rearwardly extended portion 261, designed to pass into the line of movement of gravity-stops 262, adjustable longitudinally on the rod 185, connected to the arms 183 of the compression-roller frame. These stops 262 are held as adjusted by means of a rack 264, mounted on the carriage. From an arm on the rock-shaft 125 a draw-bar 265 extends downward and connects at its lower end to a tabulating key-lever 266, as clearly shown in Fig. 12.

In operation after setting the stop devices 262 to the proper position, which may be indicated by the scale on the rack-plate, and after operating the key-levers to do any desired printing the pressing downward of the lever 266 will rock the shaft 125, causing the hook end of the plate 260 to engage with the bar 157, moving the rack 156 out of engagement with the controlling-dog, as clearly indicated by dotted lines in Fig. 12. As before stated, this movement of the plate 160 will move its projection 261 into line with one of the stops 262, as is also indicated by dotted lines in Fig. 12. Therefore the carriage under the impulse of its feeding-spring may move quickly to the left until it engages with said stop-plate 262 at the left. The bearing of the pointed end of the plate 260 upon the bar 157 also acts as a brake to regulate the speed of back movement—that is, by more or less pressure the said movement may be regulated.

Having thus described my invention, I claim as new and desire to secure by Letters Patent—

1. In a type-writer, a carriage, a track or rail at the forward portion of said carriage, a bar adjustable in the machine-frame, rollers on said bar with which the lower edge of the track engages, and a roller engaging with the upper edge of the track to prevent an upward movement of the carriage.

2. In a type-writer, a carriage, a track arranged in the forward portion of said carriage, a spring-yielding and adjustable bar arranged in the machine-frame, rollers on said bar with which the lower edge of said track engages, and a vertically-adjustable roller engaging with the upper edge of the carriage.

3. In a type-writer, a carriage, a track arranged at the forward portion of said carriage, a bar supported in the frame of the machine, rollers on said bar with which the lower edge of the track engages, a plate adjustable vertically on an upright on said bar, and a roller carried by said plate for engaging the upper edge of the track.

4. In a type-writer, a frame having a track or rail in its upper portion angular in cross-section, a carriage, collars attached to the said carriage and engaging around the track or rail, rollers in the upper portions of said collars for engaging the top of the track or rail, bearing-balls seated in openings in the lower portions of the collars, and screw-plugs for said openings.

5. In a type-writer, a frame, a track or rail extended along the rear portion of said frame, a carriage, a plate removably attached to a rear bar of said carriage, collars on said plate for engaging around said track or rail, and means for causing movements of the carriage.

6. In a type-writer, a frame, a carriage having a track or rail at its forward portion, rollers adjustably supported in the frame on which said track or rail engages, means for preventing an upward movement of said track or rail relatively to the rollers, a track or rail arranged in the rear portion of the machine-frame, and collars on the rear portion of the carriage through which said last-named track or rail passes.

7. In a type-writer, a frame, plates adjustable longitudinally on a rear bar of said frame, arms extended upward from the outer ends of said plates, and a track or rail adapted to be engaged with said arms.

8. In a type-writer, a frame, a carriage, a plate removably connected to said carriage, a track or rail at the rear portion of the frame, collars on said plate through which said track or rail passes, a gong, a striker for said gong, and a tappet adjustable on said plate for operating the striker.

9. In a type-writer, a frame, a carriage movable on the frame, a rocking bar supported in the carriage, a rack on said bar, a spring for holding said rack in normal position, an adjustable stop for said bar, an arm mounted to swing in the frame, dogs supported on said arm one above the other, one of said dogs having spring-yielding lateral movement, the said dogs being adapted to engage with the rack, means for operating the dogs vertically, a rock-shaft in the machine-frame, a finger-lever having connection with said rock-shaft, and a device carried by said rock-shaft for engaging with the rack-supporting bar to move it out of its engagement with the dogs.

10. In a type-writer, a frame, a carriage movable on the frame, a rack connected to the carriage, an arm mounted to swing in the frame, a fixed dog on said arm for engaging with the rack, a swinging dog on said arm for engaging with the rack, springs supported on the arm and engaging with the swinging dog at opposite sides, one of said springs having less resistance than the other, and an adjusting-screw in the arm for engaging with the spring having the greater resistance.

11. In a type-writer, a frame, a rail or track on the rear portion of said frame, a rack on the frame below the rail or track, a carriage, collars on said carriage engaging around the rail or track, and a stop-plate mounted to swing on the rail or track and held in engagement with the rack by the weight of its outer end.

12. In a type-writer, a frame, a carriage movable on the frame, means for governing the movements of said carriage, an impression-roller frame mounted to swing in the carriage, an impression-roller mounted in said frame, oppositely-extended levers, rollers on the inner ends of the levers for engaging with the roller-frame, finger-levers, and connections between the finger-levers and the first-named levers for causing vertical movements of the roller-carrying frame.

13. In a type-writer, a frame, a carriage movable on the frame, an impression-roller frame mounted to swing in the carriage, oppositely-extended levers supported in the machine-frame, rollers on the inner ends of said levers for engaging with the impression-roller frame, finger-levers mounted in the main frame at opposite ends, connections between said finger-levers and the roller-carrying levers, a rock-shaft, a latch carried on said rock-shaft for holding one of the finger-levers downward, and a plate on said rock-shaft adapted to be engaged with the other of said finger-levers for moving the latch out of engagement with its finger-lever.

14. In a type-writer, a carriage, an impression-roller, a ratchet-wheel on one end of said roller, a frame in which the roller is mounted, the said frame being mounted in the carriage, a spring-pressed arm on a trunnion of the roller, a dog carried by said arm for engaging with the ratchet-wheel, a lug extended outward from said arm, a lever pivoted on the frame to swing substantially on a horizontal plane, a projection on said lever for engaging with said lug, and means for engaging with said lug to limit the movement of the arm.

15. In a type-writer, a carriage, an impression-roller-supporting frame mounted in the carriage, an impression-roller in the frame, a ratchet-wheel on one end of said roller, a spring-pressed arm mounted to swing on a trunnion of the roller, a dog pivoted to said arm and engaging with the ratchet-wheel, a back-stop for said arm, a lug extended outward from the arm, a laterally-swinging lever for engaging with said lug to operate the arm in one direction, a lever having sliding connection in an end plate of the frame, means for holding said lever as adjusted, and a lug attached to said lever for engaging the lug on the dog-supporting arm.

16. In a type-writer, an impression-roller, a frame in which the roller is mounted, a ratchet-wheel on one end of said roller, means engaging with the ratchet-wheel for causing the rotary movements of the roller, a spring-pressed roller for engaging with the ratchet-wheel to cause a click or signal, and a sliding plate for holding said signal-roller out of engagement with the ratchet-wheel, the said plate also serving as a brake by engaging with the ratchet-wheel while holding the roller out of engagement therewith.

17. In a type-writer, an impression-roller frame, a spring-held rock-shaft mounted in said frame, an impression-roller, a guide-plate extended around the under side of the roller and having openings in its rear portion, arms extended from said rock-shaft, a rod having bearings in said arms, the said bearings being opened outward, a spring-clip attached to the shaft for engaging with said rod, and rollers mounted on the rod and adapted to pass through the openings of the plate.

18. In a type-writer, an impression-roller frame, a spring-held rock-shaft mounted in said frame, an impression-roller, a guide-plate extended around the under side of the roller and having openings in its rear portion, arms extended from said rock-shaft, a rod having bearings in said arms, the said bearings being opened outward, a spring-clip attached to the shaft for engaging with said rod, rollers mounted on the rod and adapted to pass through the openings of the plate, and an upwardly-extended finger-piece at one end of said rock-shaft.

19. In a type-writer, a main frame, a carriage mounted to slide on the frame, an impression-roller frame mounted to swing in the carriage, an upwardly spring-yielding bar mounted in the main frame, levers mounted on the forward side of said bar, rollers on the inner ends of said levers for engaging with the impression-roller frame, finger-levers having connection with the outer ends of said levers, a spring-pressed rock-shaft in the main frame, a latch-plate on one end of said shaft, the edge of said plate above its hook portion being inclined upward and forward, a pin on one of the finger-levers for engaging with said latch, and a plate on the front end of said rock-shaft in the line of movement of the other of said finger-levers.

20. In a type-writer, a main frame, a carriage movable on the frame, a rack mounted in the carriage, a dog mounted to swing in the frame and operated by a finger-lever for engaging with the rack, a curved finger carried by said dog, a rock-shaft in the carriage, a stop-block on the rock-shaft and having forwardly-extending teeth at its ends adapted to be engaged by said curved finger, and means for rocking the shaft to release the finger from the first one of said teeth.

21. In a type-writer, a main frame, a carriage movable on the frame, a rack mounted to rock in the frame, a swinging dog on the frame for engaging with the rack, means for swinging the rack out of engagement with the dog, a rock-shaft mounted on the carriage, a stop-block on the rock-shaft and having forwardly-projecting teeth at its ends, the tooth toward the center of the machine being shorter than the other teeth, a spring-yielding curved finger carried by the dog and adapted to be engaged on the upper side of said shorter tooth and to engage with the longer tooth, and means for rocking the rock-shaft to release the finger from the shorter tooth.

22. In a type-writer, a main frame, a carriage movable on the frame, a rack mounted to rock in the carriage, a dog mounted to swing on the main frame for engaging with the rack, the said dog being moved in one direction by a finger-lever of the machine, a spring-finger carried by the dog and having a hooked upper end, a rock-shaft mounted in the carriage, a stop-block adjustable on said rock-shaft and having forwardly-extended teeth at its ends, the tooth toward the center of the machine being shorter than the other tooth, the said teeth being adapted for engagement with said finger, a wing or plate attached to the rear side of said rock-shaft, a draw-rod adapted for engagement with said wing or plate, a lever for operating said draw-rod, and means for rocking the rack.

23. In a type-writer, a main frame, a carriage movable on the main frame, a rack on the carriage, a roller-carrying frame mounted in the carriage, a gravity stop-plate adjustable on said frame and adapted to engage with said rack, and a plate carried by a rock-shaft and having a portion adapted to be moved into line with said stop-plate.

24. In a type-writer, a main frame, a carriage movable on the main frame, a rack-bar mounted to rock in the carriage, a rack on said bar, a rock-shaft in the main frame, a finger-lever for operating said rock-shaft, a plate carried on the rock-shaft and having a portion for engaging with the rack-bar and also having a rearward and upward projection, a roller-supporting frame mounted in the carriage, gravity stop-plates mounted to move longitudinally of the bar of said frame, a rack on the carriage with which said plates are designed to engage, said plates being designed to be engaged by the upward and rearward projection of said plate, a rack-engaging dog mounted in the main frame, and means for operating said dog.

In testimony whereof I have signed my name to this specification in the presence of two subscribing witnesses.

JESSE ALEXANDER.

Witnesses:
 JNO. M. RITTER,
 C. R. FERGUSON.